US011711419B2

(12) United States Patent
Toval et al.

(10) Patent No.: US 11,711,419 B2
(45) Date of Patent: *Jul. 25, 2023

(54) SYSTEM AND A METHOD FOR MULTISESSION ANALYSIS

(71) Applicant: BI SCIENCE (2009) LTD, Tel-Aviv (IL)

(72) Inventors: Assaf Toval, Herzeliya (IL); Kfir Moyal, Tel-Aviv (IL); Nimrod Sandlerman, Ramat-Gan (IL)

(73) Assignee: BI SCIENCE (2009) LTD, Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,477

(22) Filed: Sep. 28, 2022

(65) Prior Publication Data

US 2023/0076960 A1 Mar. 9, 2023

Related U.S. Application Data

(63) Continuation of application No. 17/674,830, filed on Feb. 17, 2022, now Pat. No. 11,489,910.

(60) Provisional application No. 63/240,377, filed on Sep. 3, 2021.

(51) Int. Cl.
| | |
|---|---|
| *H04L 67/025* | (2022.01) |
| *H04L 67/50* | (2022.01) |
| *H04L 67/146* | (2022.01) |
| *H04L 67/1396* | (2022.01) |
| *G06F 11/34* | (2006.01) |
| *G06F 21/62* | (2013.01) |

(52) U.S. Cl.
CPC ........ *H04L 67/025* (2013.01); *G06F 11/3438* (2013.01); *G06F 21/6263* (2013.01); *H04L 67/1396* (2022.05); *H04L 67/146* (2013.01); *H04L 67/535* (2022.05)

(58) Field of Classification Search
CPC ....... H04L 67/01; H04L 67/02; H04L 67/025; H04L 67/1396; H04L 67/146; H04L 67/535; H04L 63/04–0421; G06F 11/3438; G06F 21/6245–6263
See application file for complete search history.

(56) References Cited

U.S. PATENT DOCUMENTS 9,836,760 B2 * 12/2017 Greenzeiger ...... G06Q 30/0244
10,965,573 B1 * 3/2021 Mooneyham ....... G06F 11/3466
(Continued)

*Primary Examiner* — Brendan Y Higa
(74) *Attorney, Agent, or Firm* — Smith Tempel Blaha LLC; Gregory Scott Smith

(57) ABSTRACT

A method and a system for arranging a user multi-session from a plurality of user sessions, where the sessions are received from a plurality of computerized client devices communicatively coupled via a communication network to at least one content server. At least some of the client devices may be operated by a same user, and the data content may include at least part of data communicated between any client device and any content server. The method including dividing the received data content into a plurality of sessions, where at least two sessions are associated with the same user, selecting at least two sessions received from at least two respective client devices associated with the same user, and associating the selected at least two sessions to form a multi-session.

16 Claims, 7 Drawing Sheets

(56) References Cited

U.S. PATENT DOCUMENTS

| | | | | |
|---|---|---|---|---|
| 2002/0147766 | A1* | 10/2002 | Vanska | H04L 63/12 |
| | | | | 709/205 |
| 2007/0094208 | A1* | 4/2007 | Cerrato | G06Q 30/02 |
| | | | | 706/48 |
| 2008/0250026 | A1* | 10/2008 | Linden | G06F 16/904 |
| 2012/0278331 | A1* | 11/2012 | Campbell | H04N 21/44204 |
| | | | | 707/E17.09 |
| 2015/0088598 | A1* | 3/2015 | Acharyya | G06Q 30/00 |
| | | | | 705/7.29 |
| 2015/0220970 | A1* | 8/2015 | Greenzeiger | G06Q 30/0244 |
| | | | | 705/14.43 |
| 2015/0363823 | A1* | 12/2015 | Placentra, II | G06Q 30/0246 |
| | | | | 705/14.45 |
| 2021/0019213 | A1* | 1/2021 | Mestres | G06F 11/3438 |
| 2022/0291931 | A1* | 9/2022 | Cartan | G06F 9/451 |

\* cited by examiner

SYSTEM AND A METHOD FOR MULTISESSION ANALYSIS

FIELD

The method and apparatus disclosed herein are related to surveying user interactions with computer generated content, and, more particularly but not exclusively, to identifying and analyzing different interactions of the same user as a continuous interaction.

BACKGROUND

Much research is done to analyze the experience a user may have when surfing the world wide web. The raw data for the research may be known as clickstream data or clickpath data. Various software programs such as browsers, as well as websites, may collect clickstream data. In this respect, clickstream data may include all the data that is provided to a user of a computerized device via any of the outputs of the device, as well as all the data that is provided by the user of a computerized device via any of the inputs of the device. Such data may be alphabetic, numeric, alphanumeric, graphical, image, etc.

All such clickstream data may be divided into public information and private user information (also known as personally identifying information). Such private user information may be initiated and entered by the user, or initiated and presented to the user by the website. In this respect, private user information may be associated with the user whose web activity is monitored, or can be associated with other users. All such private user information should be removed from the collected (clickstream) data. Therefore, it is difficult to follow the clickpath data, and particularly the public information contained in the clickpath data, for a user using two client devices or more.

On the other hand, a user may have a particular interest that may involve a plurality of websites. The user may access these websites in different times, and may use different client devices to access any of these websites and each such access may generate an independent clickstream session. There is thus a widely recognized need for, and it would be highly advantageous to have, a method and a system overcoming the problem of disparate sessions and clickstream data.

SUMMARY

According to one exemplary embodiment there is provided a method, and/or a computer program, and/or a computerized system executing the method, and/or the computer program, for tracking a user web journey, the method (and/or a computer program, and/or a computerized system) including an action of receiving, by a computerized server, from a plurality of computerized client devices communicatively coupled via a communication network to at least one content server of a plurality of content servers, a first data content including a plurality of first data items. At least some of the computerized client devices may be operated by a same user, and the data content may include at least part of data communicated between any computerized device of the plurality of computerized devices and any content server of the plurality of content servers. The method further including an action of dividing the first data content into a plurality of sessions, where at least two sessions are associated with the same user, an action of selecting at least two sessions received from at least two respective computerized client devices associated with the same user, and an action of associating the selected at least two sessions to form a multi-session.

According to another exemplary embodiment the method may also include the action of ordering the at least two sessions of the multi-session according to time of at least one time mark associated with the respective session.

According to still another exemplary embodiment the method at least one of the first data content and the first data items may include a respective time mark.

According to yet another exemplary embodiment the method may further include the action of analyzing the multi-session as a continuous session, and/or the action of analyzing the multi-session to determine a computerized client device of preference for a particular at least one session characteristic of the respective user.

Further according to another exemplary embodiment the method may further include the action of analyzing the sessions to determine a plurality of characteristics of the sessions to form a plurality of session characteristics, and/or the action of associating at least two sessions of the plurality of sessions with at least one session characteristic, and/or the action of selecting the at least two sessions of the multi-session according to similarity of the at least one session characteristic of the at least two sessions.

Further according to still another exemplary embodiment the method may further include the action of collecting a first plurality of sessions associated with the same user to form a session collection, the action of analyzing the session collection to determine a second plurality of sessions associated with the same user and with a same set of characteristics, the same set of characteristics including at least one session characteristic, and the action of arranging the second plurality of sessions into the multi-session.

Further according to yet another exemplary embodiment the method may further include the action of determining one session characteristic as an anchor session characteristic of the multi-session, the action selecting a second plurality of session characteristics according to at least one association between the session characteristics of the second plurality of session characteristics and the anchor session characteristic, and the action of arranging the second plurality of sessions into the multi-session according to associations between at least one session characteristics of the second plurality of sessions and the second plurality of session characteristics.

Even further according to another exemplary embodiment the method may further include the action of collecting a first plurality of session characteristics, determining a first plurality of associations associating between at least some of the session characteristics of the first plurality of session characteristics, selecting one session characteristic from the first plurality of associations as an anchor session characteristic of the multi-session, selecting a second plurality of session characteristics according to the associations between the session characteristics of the second plurality of session characteristics with the particular anchor session characteristic, and arranging the second plurality of sessions into the multi-session according to the second plurality of session characteristics.

Still further according to yet another exemplary embodiment the method may further include the action of forming the second plurality of session characteristics as a semantic network, and/or arranging the multi-session according to the semantic network.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of embodiments disclosed below involves performing or completing certain selected tasks or steps manually, automatically, or any combination thereof. Moreover, according to actual instrumentation and equipment of preferred embodiments of the method and system presented herein several selected steps could be implemented by hardware or by software on any operating system of any firmware or any combination thereof. For example, as hardware, selected steps could be implemented as a chip or a circuit. As software, selected steps could be implemented as a plurality of software instructions being executed by a computer using any suitable operating system. In any case, selected steps of the method and system disclosed herein could be described as being performed by a data processor, such as a computing platform for executing a plurality of instructions.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DESCRIPTION OF EMBODIMENTS

Figure 1:
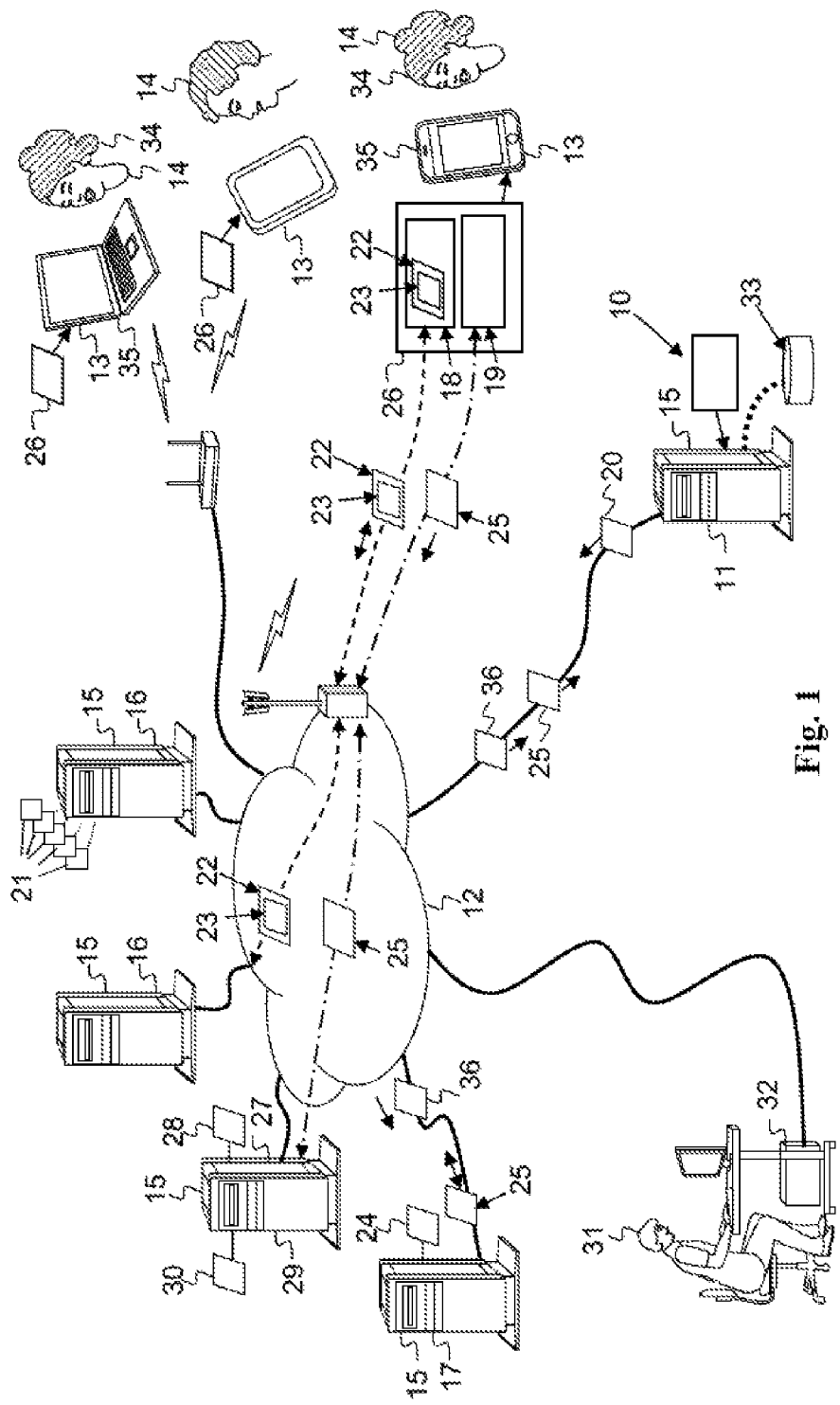
FIG. 1 is a simplified illustration of a multisession analysis system executed by at least one multisession analysis server communicatively coupled to a communication network, and, via the communication network, communicatively coupled to a plurality of client devices.

The principles and operation of a method and a system for determining and analyzing a multisession clickstream data according to some embodiments may be better understood with reference to the drawings and accompanying description.

A user may have a particular interest that may involve a plurality of sessions with one or more websites, and may be carried by one or more client devices. This plurality of sessions involving the same user interest may be analyzed as a single continuous session (multisession). The method and system described herein may therefore identify different clickstream sessions that are associated with the same user interest, and analyze this string of sessions as a single continuous multisession.

Before explaining at least one embodiment in detail, it is to be understood that each of the embodiments may not be limited in their application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

The terms 'a' or 'an', as used herein, are defined as one or more than one. The term plurality, as used herein, is defined as two or more than two. The term another, as used herein, is defined as at least a second or more. The terms including and/or having, as used herein, are defined as comprising. The term coupled, as used herein, is defined as connected, although not necessarily directly, and not necessarily mechanically.

In this document, the term 'computing device' may refer to any type of computing machine, including but not limited to, a computer, a portable computer, a laptop computer, a tablet computer, a mobile communication device, a network server, a cloud computer, etc., as well as any combination thereof. Such computing device or computing machine may include any type or combination of devices, including, but not limited to, a processor or a processing device, a memory device, a storage device, a user interface device, and/or a communication device.

The terms 'execute', 'perform', compute, calculate, etc. may refer to a processor of a computational device (such as client device 13) executing a software program code embodied on a non-transitory computer readable medium to achieve a result such as described after any of the terms 'execute', 'perform', compute, calculate, etc.

The term 'client computing device', or 'client device', 'user device' may refer to any type of computing device that is directly used, or operated, by a user. Such device may include a user interface that may be used by a user directly, including means for user input and/or user output. Such device may be communicatively coupled to another computing devices such as a network server via a communication network.

Means for user input may include a keyboard, a pointing devices such as a mouse, a microphone, a camera, a touch-sensitive plate or display, means for user gesture control, means for haptic user control, etc.

Means for user output may include a display, and/or any other means for providing visual information, a speaker, or an earphone, and/or any other means for providing audible information, means for providing tactile and/or haptic information, etc.

The term 'computing device', as well as 'client device' or 'user device', may refer to, for example, a desktop computer, a portable computer, a laptop computer, a tablet computer, a mobile communication device, etc. The term 'mobile communication device" may refer to devices such as a tablet, a mobile telephone, a smartphone, etc.

The term 'network server' or 'server' may refer to any type of 'computing device' that is communicatively coupled to a communication network and may include a cloud computer, etc.

The term 'communication network' or 'network' may refer to any type or technology for digital communication including, but not limited to, the Internet, WAN, LAN, MAN, PSDN, etc. Of the abovementioned technology may be wired or wireless, for example, Wireless WAN such as WiMAX, WLAN (Wi-Fi), WPAN (Bluetooth), etc. Wireless networking technology may also include PLMN, and/or any type of cellular network.

The term 'communication network' or 'network' may refer to any combination of communication technologies, and to any combination of physical networks. The term 'communication network' or 'network' may refer to any number of interconnected communication networks that may be operated by one or many network operators.

The term 'application' may refer to a software program running on, or executed by, one or more processors of a computing devices, and particularly by a mobile computing device such as a mobile telephone, a tablet, a smartphone, etc., as well as any other mobile or portable computing facility. The term 'mobile application' may refer to an application executed by a mobile computing device.

The terms 'clickstream', 'clickpath', 'clickstream data', 'clickpath data', may include all the data that is provided to a user of a computerized device via any of the outputs of the device, as well as all the data that is collected from the user of a computerized device via any of the inputs of the device. For this matter, clickstream data is typically produced by a client device when interacting with a content server, or when a user of the client device interacts with the content provided by one or more content servers. Clickstream data may therefore include any data provided by the content server to the user, or to the client device used by the user, as well as data provided by the user, or by the client device used by the user, to the content server. Clickstream data may include private user information. Clickstream data may include advertising as well as information, data, and/or computer code pertaining to advertising.

The term 'private user information' may refer to any information, and/or data, and/or content, that is legally deemed as private to any particular user, or a private property of any particular user, or personally identifying any particular user (personally identifying information). Particularly, private user information is expected to be removed, in the client device, from clickstream data communicated elsewhere, such as to any network server. The term 'public information' may refer to clickstream data not including private user information.

The terms 'visual', 'visual object', 'graphical object', and 'mage' may refer to any type of data provided to the user of the client device or provided by the user of the client device. Such visual data may include text, symbols of any kind and shape, as well as images, such as pictures, video streams, etc.

The terms 'type', 'class' and 'characteristic' may refer to any kind of parameter, or a parameter value, or a range of values of a particular parameter, that may be common to a plurality of data items, or data records, or 'graphical objects', or images, etc.

The term 'advertising' or 'advertisement' may refer to content provided by a third party to a user of an application. An advertisement may be provided to the user in any sensible form such as sound, text, image, video, etc., and combinations thereof. In this sense, for example, the advertisement is provided to the user by the application within the application's screen display, or soundtrack, or any similar medium used by the application. Such advertisement may include private user information.

The term 'advertisement placeholder' (or ad placeholder) may refer to a place within an application, and particularly to an area within a screen display of an application, that may receive an advertisement, or in which an advertisement may be placed. An 'advertisement placeholder' may be associated with, or include, a bidding code. An advertisement placeholder may include code that may communicate with another computerized device, such as a network server, such as an ad server or ad agent. Such communication may include private user information.

The term 'bidding code' may refer to a software program that may be associated, for example, with an advertisement placeholder, and may communicate with an advertisement agent to enable advertisers to bid for the advertising place and communicate an advertisement to be displayed to the user. Such communication associated with the bidding code may include private user information.

The term 'user interest' may refer to any issue, subject, article of use, terminology, web domains, brand names, etc., that a user may search for, visit, request, receive and/or collect associated information, study and/or analyze, purchase and/or sell, etc. The term 'user interest' may refer to any link or association between different sessions, typically generating associated clickstream data. Such different sessions, and/or clickstream data, may be generated in different times, may involve different websites, and may be associated with different client devices used to access such websites.

A purpose of embodiments described herein may be to enable a server collecting clickstream data from a plurality of client devices to identify and/or to associate two or more sessions, and/or associated clickstream data, and analyze the plurality of sessions, and/or associated clickstream data, as a continuous multisession, and/or continuous clickstream data.

In this respect, the purpose of embodiments described herein may be to enable a network server collecting clickstream data from a plurality of client devices to identify a plurality of users, and to associate at least one of the users with two or more client devices that are used, and/or have been used, by this particular user. The network server may then analyze the plurality of clickstream data to determine at least one user interest, associated with a particular user, and to determine a plurality of clickstream data (sessions) associated with the particular user and the particular user interest. The network server may then arrange, or assemble, the plurality of clickstream data (sessions) associated with the particular user and the particular user interest as a single, continuous, multisession, clickstream data. The network server may then analyze the continuous, multisession, clickstream data.

For example of a user interaction with any number of content providing servers, a user may perform a high degree of web interactions via his devices. With each device, the user may search for a product, view an offering, run through a catalog of products and choose to buy or register to a certain service. To identify the user intent and path to purchase, the multisession analysis system described below may analyze the clickstream data and associate it with the information of each browsing session of the user to depict the complete end-to-end journey of such user.

Reference is now made to FIG. 1, which is a simplified illustration of a multisession analysis system 10 executed by at least one multisession analysis server 11 communicatively coupled to a communication network 12, and, via the communication network 12, communicatively coupled to a plurality of client devices 13, according to one embodiment.

FIG. 1 shows a plurality of first users 14, each using a respective computational device, which is termed here client device 13. Each client device 13 may be communicatively coupled to the communication network 12 via any communication technology, and/or any combination of communication technologies and/or any combination of communication networks.

Each client device 13 may be communicatively coupled via communication network 12 to one or more network servers 15. For example, each client device 13 may be communicatively coupled via communication network 12 to a content providing network server 16 (content server 16), to a multisession analysis server 11, and to a survey server 17.

It is appreciated that multisession analysis system 10, and multisession analysis server 11 may be part of a survey system for surveying user journey as well surveying advertisements related to the user journey. In this respect, analysis system 10, and multisession analysis server 11 may create and/or arrange clickstream data into multisession data and provide it to the survey system and/or survey server 17. It is appreciated that multisession analysis server 11 and survey server 17 may be the same server 15. Alternatively, the survey system and the multisession analysis system 10 may be regarded as the same system.

FIG. 1 shows client device 13, for example, as a mobile telephone or a smartphone, or a tablet computer, or a laptop computer. However, client device 13 may be any type of computer including a desktop computer, etc.

Each client device 13 may execute software programs such as one or more applications 18. Each client device 13 may also execute a client surveying software program 19, which may be part of the survey system, which may include one or more survey servers 17.

In this regard, client surveying software program 19 of the survey system may create and/or collect clickstream data, or clean clickstream data (clickstream data not including private personal information) and provide the clickstream data to multisession analysis server 11 and/or multisession analysis system 10. Multisession analysis server 11 and/or multisession analysis system 10 may then correlate various sessions of clickstream data into a multisession clickstream data 20 and provide it to the survey system and/or survey server 17.

Any of the applications 18 may include a user interface for interacting with user 14. Such user interface may include various input and output devices and/or respective software modules, for presenting content to user 14, and/or for receiving content from user 14, or under the control of user 14. Such content (e.g., content 21) to be presented to user 14 may be received from one or more content servers 16. Such content received from user 14 may be communicated to one or more content servers 16. Such content communicated between user 14 and one or more content servers 16 may be referred to as clickstream data 22. Such clickstream data may include private user information 23.

The survey system may include any number of client surveying software program 19 (e.g., client survey software 19) installed in and executed by respective client devices 13, as well as server surveying software program 24 (e.g., server survey software 24) installed in, and executed by, one or more surveying servers 17. Client survey software 19 may collect clickstream data, in whole or in part, and communicate the collected clickstream data, in whole or in part, to a respective server survey software 24.

It is appreciated that the survey performed by the survey system may include a large number of users using various computational devices, operating a large variety of applications, including mobile applications, visiting a large variety of websites and/or content servers, and receiving a large variety of advertisements.

It is appreciated that several surveys may be performed at the same time, or concurrently, by the same survey system or by several different survey systems. It is appreciated that each surveying server 17, and/or server survey software 24, may communicate with any number of client devices 13, and/or client survey software programs 19. It is appreciated that a client device 13, and/or a client survey software 19, may communicate with any number of surveying servers 17, and/or server survey software programs 24. Client survey software 19 may remove private user information 23 from clickstream data 22 thus forming cleaned clickstream data 25 communicated from client survey software 19 to server survey software programs 24 as well as to the multisession analysis system 10.

It is appreciated that client devices 13 may each execute a software package 26, which may include various versions of one or more applications 18, one or more client survey software 19 including client privacy software for removing private user information 23 from the clickstream data communicated to the survey servers.

The cleaned clickstream data 25 communicated to the survey servers 17 may be provided to the multisession analysis system 10 directly from the respective client devices 13, for example, by the client survey software 19, and/or by the surveying server 17, for example, by the server survey software program 24. It is appreciated that such cleaned clickstream data 25 received by the multisession analysis system 10 and/or the multisession analysis server 11 may not include private user information 23.

For this matter FIG. 1 also shows one or more privacy control servers 27 executing respective privacy control server software 28, as well as one or more client device association servers 29 executing respective client device association software 30. It is appreciated that privacy control server software 28 and/or client device association software 30 may be regarded as part of the survey system, and for this matter client survey software 19 may also serve privacy control server software 28 and/or client device association software 30.

FIG. 1 also shows a user 31, such as a system administrator, the multisession analysis system 10, for example, using an administration terminal 32. FIG. 1 also shows a database, or data repository 33, which may be a part of the multisession analysis system 10.

It is appreciated that client survey software 19 and server survey software programs 24 may be parts of a survey system, and that such survey system is used herein as an example of a system that may collect data, such as clickstream data 22, from a client device 13, and/or an application 18. It is appreciated that clickstream data 22 is used here as an example of any type of data collected by client survey software 19 or a similar software program, and communicated to an external software program represented herein as server survey software programs 24.

It is appreciated that sever software programs such as server survey software 24 and multisession analysis system 10 may be combined and provided as a single software program.

As shown in FIG. 1, a first plurality of users 14 may be using a second plurality client device 13 where any user of the first plurality of users 14 may use more than one client device 13. For example, user 14 designated by numeral 34 is using two different client devices 13, both designated by numeral 35. Client device association software 30 may collect and analyze clean clickstream data 25 to determine associations between users 14 and client devices 13. Client device association software 30 may then communicate to server survey software programs 24, and/or multisession analysis server 11, such associations 36 of particular client devices 13 to their respective users 14.

Figure 2:
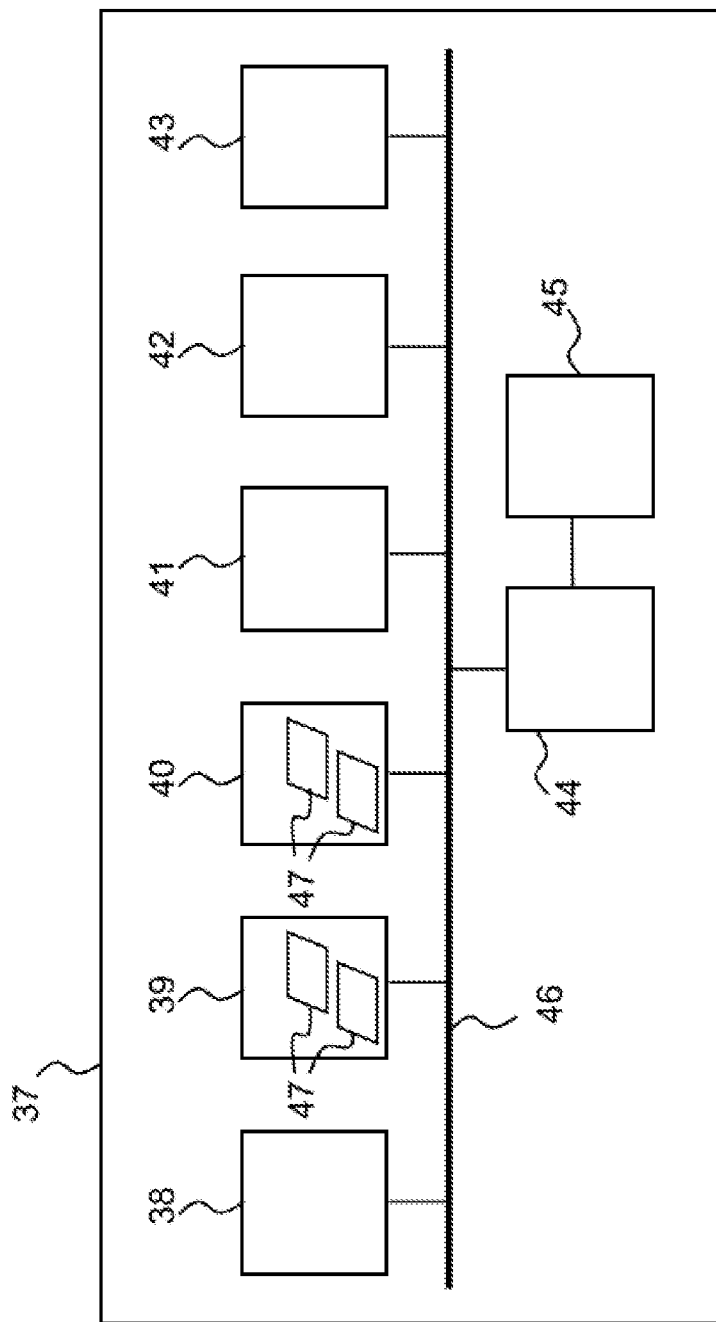
FIG. 2 is a simplified block diagram of a computing device such as the client devices or servers of FIG. 1.

Reference is now made to FIG. 2, which is a simplified block diagram of computing device 37, according to one embodiment.

As an option, the block diagram of computing device 37 of FIG. 2 may be viewed in the context of the details of the previous Figures. Of course, however, the block diagram of computing device 37 of FIG. 2 may be viewed in the context of any desired environment. Further, the aforementioned definitions may equally apply to the description below.

It is appreciated that client device 13, and/or network server 15, may be embodied as one or more computing devices 37 (or computational devices 37). Computing devices 37 can therefore represent a smartphone, a tablet, a laptop computer, a desktop computer, a network server 15, or a part of a network server 15, or a plurality of network servers 15, or a data-center, including cloud-based computing infrastructure.

In this respect, the survey system, and all its components, as well as multisession analysis server 11, may be embodied using one or more computing devices 37. Computing device 37 may therefore be operative to provide computing infrastructure and resources for any type and/or instance of software component executed within survey system, or multisession analysis server 11. In this regard computing device 37 is operative to process any of the processes described herein. Particularly, computing device 37 one or more non-transitory computer readable media on which software program code may be embodied.

As shown in FIG. 2, computing device 37 may include the following components:

At least one processor unit 38 operative to execute one or more software programs as disclosed with reference to FIG. 1.

One or more memory units 39, e.g. random-access memory (RAM), a non-volatile memory such as a Flash memory, etc., operative to store software programs, parameters, data, databases, digital content, etc.

One or more storage units 40 including, for example, a hard disk drive and/or a removable storage drive, representing a floppy disk drive, a magnetic tape drive, a compact disk drive, Flash drive, etc. The removable storage drive reads from and/or writes to a removable storage unit in a well-known manner. The storage units being operative to store software programs, parameters, data, databases, digital content, etc.

One or more communication units 41 operative to communicatively couple computing device 37 to at least one communication network 12 as disclosed herein and in FIG. 1.

One or more user interface devices including, for example, one or more graphic processors 42 and displays 43 operative to enable a user to operate and control computing device 37 and software programs executed by computing device 37.

A power supply 44 and power source 45, such as a battery, for example, if computing device 37 is a mobile, and/or portable, computing device.

One or more communication buses 46 connecting the above units.

One or more computer programs 47, or computer control logic algorithms, which may be stored in any of the memory units 39 and/or storage units 40. Such computer programs, when executed, enable computing device 37 to perform various functions (set forth herein, for example). Memory units 39 and/or storage units 40 and/or any other storage are possible examples of tangible computer-readable media.

It is appreciated that any software program of FIG. 1 may be embodied as a computer program 47 of FIG. 2. For example, applications 18, client surveying software program 19, client privacy software, server survey software 24, association system 10, etc.

Figure 3:
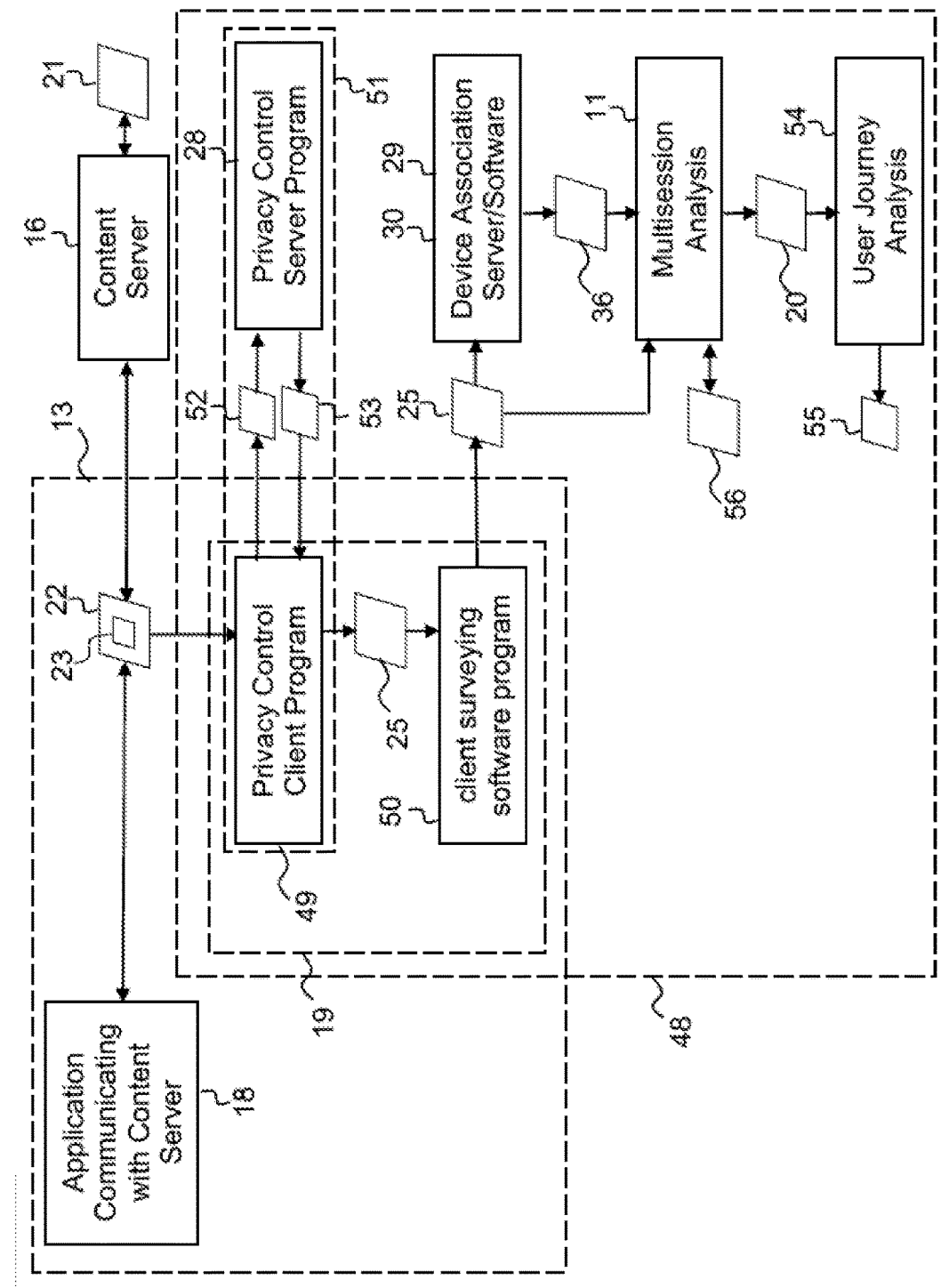
FIG. 3 is a simplified block diagram of survey system including multisession analysis system.

Reference is now made to FIG. 3, which is a simplified block diagram of survey system 48 including multisession analysis system 10, according to one exemplary embodiment.

As an option, the block diagram of FIG. 3 may be viewed in the context of the details of the previous Figures. Of course, however, the block diagram of FIG. 3 may be viewed in the context of any desired environment. Further, the aforementioned definitions may equally apply to the description below.

As shown in FIG. 3, application 18 may interact with a content server 16, thus generating clickstream data 22, which may include private user information 23. Client survey software 19 executed by a processor of client device 13 may include a client privacy control software program 49 and client surveying software program 50.

Client privacy control software program 49 may be communicatively coupled with server privacy control software program 28, together forming a privacy control system 51. Client privacy control software program 49 may send raw clickstream data 52 to server privacy control software program 28 for analyzing and determining what forms private user information. Server privacy control software program 28 may send privacy rules 53 to client privacy control software program 49. Client privacy control software program 49 may use privacy rules 53 to detect and remove private user information 23 from the collected clickstream data 22 to form clean clickstream data 25. Client privacy control software program 49 may then communicate clean clickstream data 25 to client surveying software program 50.

Client surveying software program 50 may communicate clean clickstream data 25 to device association server 29 and/or software program 30. Device association software program 30 may then determine, based on the clickstream data 25, which client device 13 is associated with, or used by, user 14. Device association software program 30 may then create and maintain a database of associations 36 of particular client devices 13 to their respective users 14. Device association software program 30 may then communicate device associations database 36, or device associations updates 36, to multisession analysis server or software 11.

Multisession analysis server/software 11 may also receive clean clickstream data 25, for example from client surveying software program 50, and analyze it to form multisession clickstream data 20. Multisession analysis server/software 11 may then communicate the multisession clickstream data 20 to the survey system and/or survey server 17, and particularly to user journey analysis software 54. Survey system and/or survey server 17, or user journey analysis software 54, may then analyze the multisession clickstream data 20 to form user journey analysis results 55, which are made available to users such as administrator 31.

In the process of analyzing clean clickstream data 25 and creating multisession clickstream data 20, multisession analysis server/software 11 may create and maintain one or more multisession databases 56 as will be further described below.

Figure 4:
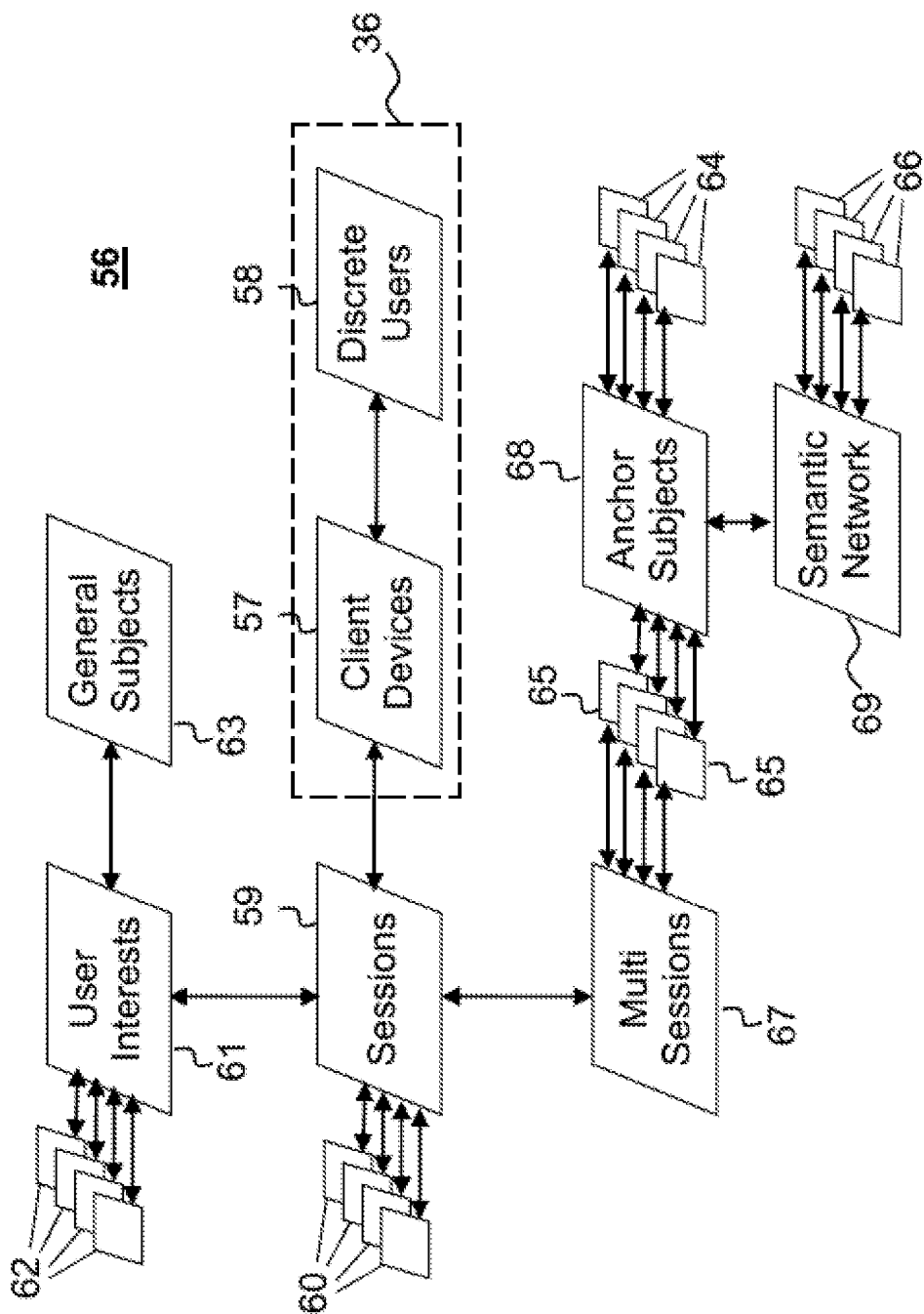
FIG. 4 is a simplified block diagram of multisession databases of FIG. 3.

Reference is now made to FIG. 4, which is a simplified block diagram of multisession databases 56 of FIG. 3, according to one exemplary embodiment.

As an option, the block diagram of FIG. 4 may be viewed in the context of the details of the previous Figures. Of course, however, the block diagram of FIG. 4 may be viewed in the context of any desired environment. Further, the aforementioned definitions may equally apply to the description below.

Multisession analysis system 10 may receive clickstream data (e.g., clickstream data 25) that may include a time mark associated with the time of the starting and ending of the particular clickstream data session. The clickstream data may also include an identification of the client device 13 generating the clickstream data. However, the clickstream data may not include any private user information. In this respect the user is anonymous.

However, the associations database 36 may associate the particular clickstream data generated by a particular client device 13 with a particular anonymous user (discrete user). Associations database 36 may therefore include a device database 57 of all client devices 13 that have generated clickstream data 25, and a user database 58 of discrete users, each associated with at least one client device of device database 57.

As shown in FIG. 4, multisession analysis system 10 may create a session database, or repository, 59 of clickstream data session 60 associated with each discrete user, indicating the time and client device 13 generating the particular clickstream data (session). In this regard, a session, or clickstream session, may refer to clickstream data associated with start time, end time, a particular client device 13 and a particular discrete user. Each discrete user of session database 59 may therefore have a timeline of sessions, as will be further described below.

Multisession analysis system 10 may analyze each session 60 to determine and derive any number of user interests associated with the particular session 60. Such user interest may be a domain visited within the session, a term searched, a term presented to the user by the visited web-page, an advertisement presented to the user, an advertiser presenting the advertisement, a brand name associated with the advertisement, a type or category of article of use, or service, associated with the brand, a landing URL such as associated with the advertisement, etc. Obviously a session may include a plurality of terms of any type as discussed above as well as other terms.

Multisession analysis system 10 may therefore create and maintain a user subject database, or repository, 61 of the user's interests 62, where each user interest 62 is associated (e.g., via a pointer field) with one or more sessions associated with the particular user. Multisession analysis system 10 may also create and maintain a general subject database, or repository, 63 of all the user interests 62 identified within the session database 59.

Multisession analysis system 10 may then determine one or more anchor subjects 64 which may form the basis, or anchor, of a particular multisession 65. An anchor subject may be any term, user interest, or event. For example, an anchor may be the purchase of a particular article, or service, subscription, upgrade, benefit, etc.

For example, multisession analysis system 10 may determine a particular user anchor subject 64 for a particular session 60, and then search for other sessions 60 that are also associated with the particular same anchor subject 64. Typically multisession analysis system 10 may search backward in time for previous sessions 60 that are associated with this particular anchor subject 64.

While searching for further sessions 60 associated with the anchor subject 64 multisession analysis system 10 may create and maintain a semantic network 66 for the particular anchor subject 64. Each semantic network 66 may be a list, or a group, of terms, such as user interests 62, that are derived from the sessions 60 associated with the particular anchor subject 64, and support the particular anchor subject 64.

Multisession analysis system 10 may then search for further sessions 60 associated with the particular anchor subject 64 based on the developing semantic network 66. The group, or list, or thread, of sessions 60 associated with the particular anchor subject 64 may form a particular multisession 65.

The semantic network 66 associated with a particular anchor subject 64 may be used to compute an association score of each session 60 associated with the particular anchor subject 64. For example, each term of a particular semantic network 66 may be allocated a weight. For example, terms closer to the core of the particular semantic network 66 may have a weight that is higher than terms closer to the periphery of the particular semantic network 66.

New terms added to the semantic network 66 may be added to the periphery of the particular semantic network 66. Terms that are repeated in several sessions 60 associated with the particular anchor subject 64 may be moved closer to the core of the particular semantic network 66, or otherwise have their respective weight increase.

A session 60 may be associated with the particular anchor subject 64 if the total association score of the particular session 60 with the particular anchor subject 64 may reach a predetermined threshold.

Multisession analysis system 10 may therefore create and maintain a multisession database 67 of multisession 65, as well as an anchor database 68 of anchor subjects 64, as well as a semantic database 69 of semantic networks 66.

Figure 5:
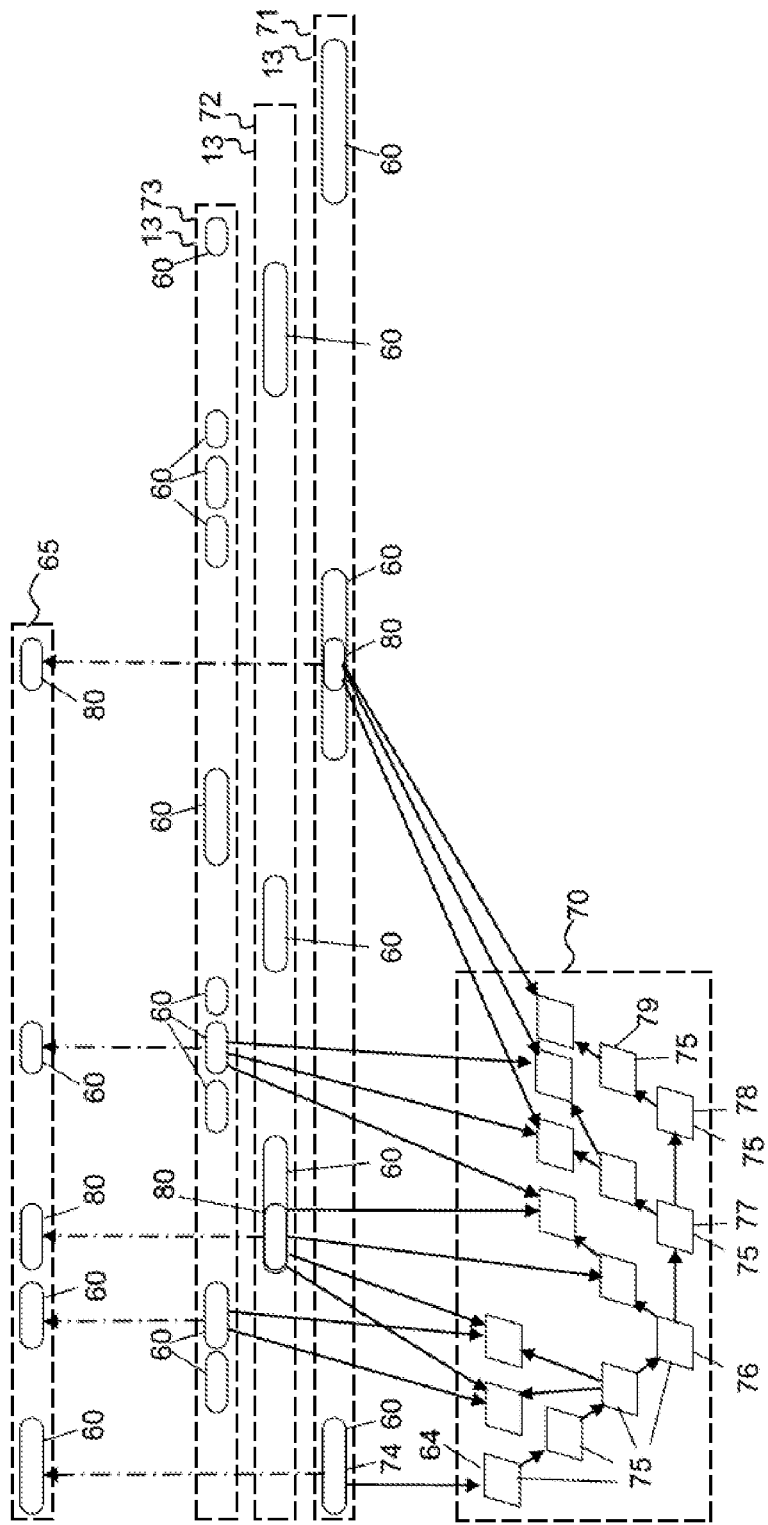
FIG. 5 is a simplified block diagram of the relations between a multisession, associated with a semantic network, both derived from a plurality of sessions associated with the same user.

Reference is now made to FIG. 5, which is a simplified block diagram of the relations between a multisession 65, associated with a semantic network 70, both derived from a plurality of sessions 60 associated with the same user, according to one exemplary embodiment.

As an option, the block diagram of FIG. 5 may be viewed in the context of the details of the previous Figures. Of course, however, the block diagram of FIG. 5 may be viewed in the context of any desired environment. Further, the aforementioned definitions may equally apply to the description below.

As shown in FIG. 5, a particular user 14 may be using a plurality of particular client devices 13 such as, for example, a particular desktop computer 71, a particular tablet 72, and a particular smartphone 73, which are associated by client device association software 30 with the particular user.

Sessions 60 of FIG. 5 are ordered according to their respective time marks from right to left. The length of the respective session 60 may denote the time length, or period, of the respective session 60. Time periods between sessions 60 are eliminated from FIG. 5. As shown in FIG. 5, sessions 60 of desktop computer 71 may be longer, while sessions 60 of smartphone 73 may be more frequent.

The last and leftmost session 60 indicated by numeral 74 may be defined by, and/or includes, an anchor subject 64. This anchor subject 64 may serve as the core, or part of the core, of the semantic network 70. Semantic network 70 may develop from left to right to include a plurality of semantic network terms 75. Semantic network 70 may be used to define, or characterize, multisession 65. A semantic network term 75 may be, for example, a user interest 62 or any other term, typically derived from general subject database, or repository, 63.

In the block diagram of the semantic network 70 of FIG. 5, a lower layer of semantic network terms 75 may denote more general semantic network terms 75. For example, anchor subject 64 may involve the purchase of a particular article, or a particular model (of the article). The semantic network term 75 connected and below anchor subject 64 may denote the brand name of the particular article of anchor subject 64. The term 75 connected and below the brand name may denote the maker, or manufacturer, of the brand. And the term 75 connected and below the manufacturer (designated by numeral 76) may denote a general term for the article, such as a shoe, or a car, or a TV series, or a subscription to a particular type of service, etc. The term 75 to the right of 'shoe' (designated by numeral 77) may denote 'sport'. And the term 75 to the right of 'sport' (designated by numeral 78) may denote 'outfit'. The term connected and above 'outfit' (designated by numeral 79) may denote a manufacturer of outfit, and the terms connected and above the competing manufacturers may denote particular respective brands.

It is appreciated that the terms of semantic network 70 are derived from, or found in, particular sessions 60 associated with the client devices 71, 72, and 73 associated with the particular user, as shown in FIG. 5. Each term of semantic network 70 may appear in one or more sessions 60. The term may appear as a search term entered by the user, or as a search result term provided by a content server 16, or in an advertisement presented within the content 21, etc.

Multisession analysis system 10 may therefore determine a particular session 60 carrying a particular anchor subject 64, scan the plurality of sessions 60 associated with the same user to identify terms and develop a semantic network 70 associated with the particular anchor subject 64, and determine a multisession 65 associated with the terms of the particular semantic network 70.

As shown in FIG. 5, multisession 65 may include a first plurality of sessions 60, which is part of a second, larger, plurality of sessions 60 associated with the same user. As shown in FIG. 5, multisession analysis system 10 may determine a sub-session 80, which may be part of a session 60. A sub-session 80 may be defined by a start time, and/or an end time which may be different from the start time, and/or end time of the respective session 60. Multisession analysis system 10 may then include in multisession 65 the sub-session 80 instead of the respective session 60.

It is appreciated that any session 60, or sub-session 80, or any other part of a session 60, may be part in any other sequence of session 60 (and/or sub-session 80) forming a different multisession 65, typically based on a different anchor subject 64. Hence, session 60 of client devices 71, 72, and 73 may produce any number of multi-sessions 65. Some of the multi-sessions 65 associated with client devices 71, 72, and 73 (and/or the user associated with client devices 71, 72, and 73) may overlap in time, partly and/or entirely.

Figure 6:
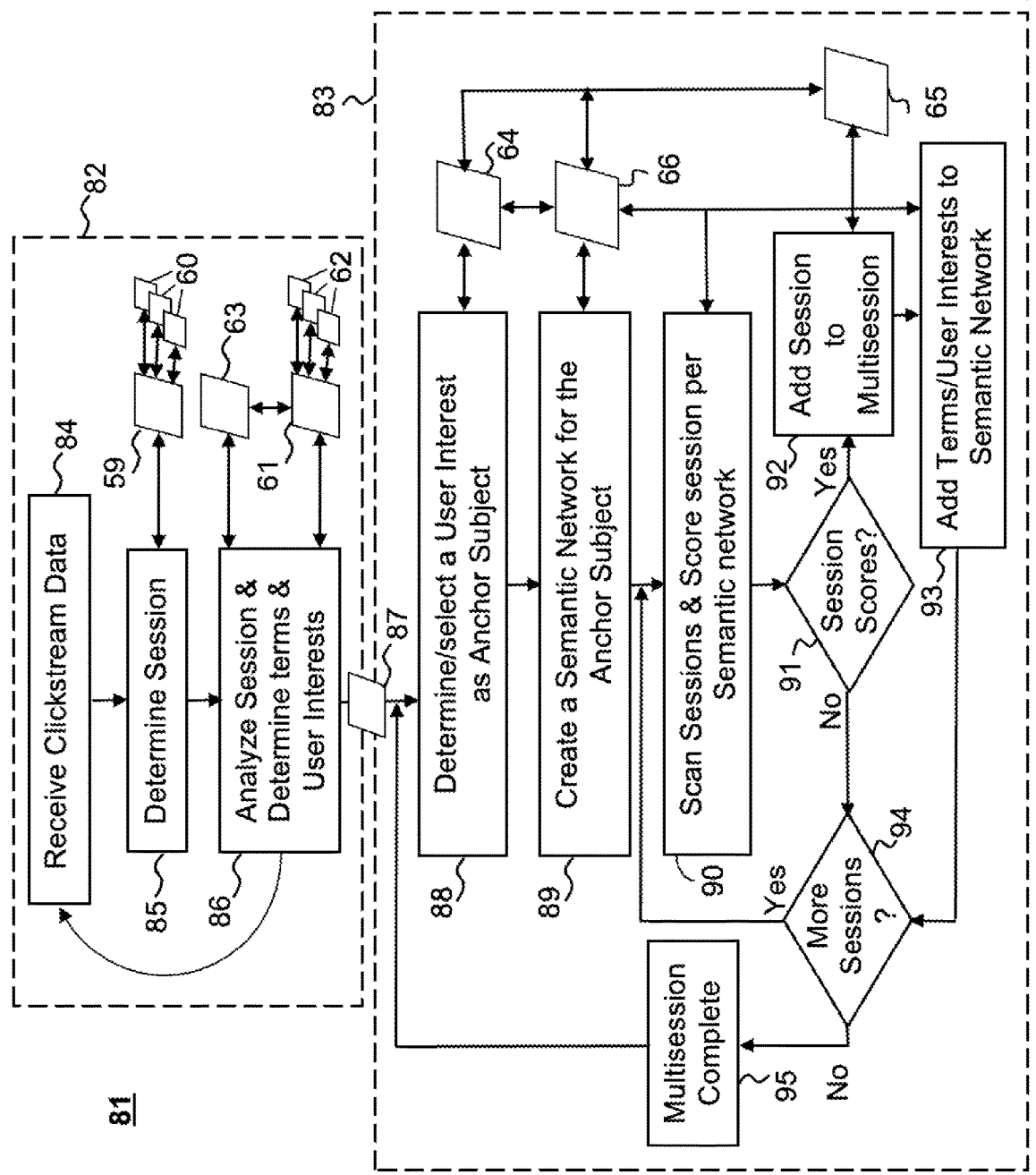
FIG. 6 is a simplified flow chart of a multi-session generation process executed by multisession analysis system and/or multi-session analysis server.

Reference is now made to FIG. 6, which is a simplified flow chart of a multi-session generation process 81 executed by multisession analysis system 10 and/or multi-session analysis server 11, according to one exemplary embodiment.

As an option, the flow chart of FIG. 6 may be viewed in the context of the details of the previous Figures. Of course, however, the flow chart of FIG. 6 may be viewed in the context of any desired environment. Further, the aforementioned definitions may equally apply to the description below.

Multi-session generation process 81 may include two routines that may be executed in series and/or in parallel. A first, session collection routine 82 may collect clickstream data 25 and create and/or update session database 59 of sessions 60. A second, multi-session creation routine 83 may analyze session database 59 and determine which sessions 60 to select to create a particular multisession 65.

Multi-session generation process 81 may start with session collection routine 82, which may then trigger multi-session creation routine 83. Session collection routine 82 may then repeat whenever new clickstream data 25 is received, with multi-session creation routine 83 being optionally executed in parallel. For example, as shown in the flow-chart of FIG. 6, a new user interest 62 may serve as a trigger to initiate a new scan by multi-session creation routine 83. For example, if multi-session creation routine 83 determines that the new user interest may serve as an anchor subject 64.

Session collection routine 82 may start with action 84 for example, by receiving clean clickstream data 25. Session collection routine 82 may proceed to action 85 to determine a session and store the session data and parameters in session database 59 (as a session 60). Session parameters may include start and stop time marks, identification of the client device 13 from which the clickstream data 25 of the particular session 60 was received, optionally the user associated with the particular client device 13, associated terms such as user interest terms, etc.

A particular session 60 may be determined, for example, based on time elapsing between successive clickstream data items received from a particular client device 13. For example, if such non-data time period (between successive clickstream data items) is longer than a predetermined threshold value then the clickstream data collected between the two consecutive non-data time periods may be determined as a session 60.

Session collection routine 82 may proceed to action 86 to analyze the clickstream data 25 of the session 60 and to determine terms, such as user interest terms 62 (as defined above), which the clickstream data 25 of the session 60 may include.

Action 86 may update user subject database 61, as well as general subject database 63, with each new term identified. Action 86 may update the entry of a particular user interest (in the user subject database 61) with an additional pointer to the current session 60. Action 86 may then update multi-session creation routine 83 with any new user interest 87, which may serve as a candidate anchor subject 64.

Multi-session creation routine 83 may then start with action 88 by determining a user interest to be candidate anchor subject 64 for a respective, new, candidate, multi-session 65. Multi-session creation routine 83 may then proceed to action 89 to start a new semantic network 66 for the new multi-session 65 and the respective anchor subject 64. Multi-session creation routine 83 may include in the new semantic network 66 any term, or user interest, that is associated with the current session 60 associated with the new anchor subject 64.

Multi-session creation routine 83 may then proceed to action 90 to scan session database 59 for more sessions 60 that may participate in the current multi-session 65. For example, multi-session creation routine 83 may investigate sessions 60 that may include terms, such as user interest terms, that may appear in the respective semantic network 66. Action 90 may compute a score of each scanned session 60. Such score may be computed based on terms, or user interest items, appearing in the particular scanned session 60, and also appearing in the respective semantic network 66. Typically, action 90 may scan session database 59 backwards in time, for sessions 60 having earlier time stamps.

If, in action 91, the session 60 scores, for example, the score computed in action 90 is above a corresponding threshold value, multi-session creation routine 83 may proceed to action 92 to add the particular session 60 to the respective multisession 65. Multi-session creation routine 83 may then proceed to action 93 to optionally add to the respective semantic network 66 any term or user interest 62 that may be included in the session 60 newly added to the multisession 65 and not appearing in the respective semantic network 66.

If, in action 91, the particular scanned session 60 does not score, multi-session creation routine 83 may proceed to action 94 to determine if there are more sessions 60 to scan and thus return to action 90. If no further sessions 60 are available for scanning multi-session creation routine 83 may proceed to action 95 to complete the current multisession 65 and to make it available for further processing as a multi-session or a complex user journey.

In action 94 multi-session creation routine 83 may determine how far to scan for more sessions 60 to add to the current multisession 65. Typically, multi-session creation routine 83 may scan backwards in time until the first session 60 associated for the particular user. However, action 94 may have a threshold for limiting the search to save time, processor power, memory, etc.

For example, such threshold may be a value of time measured backwards before the start time of the earliest session 60 added to the current multisession 65. For example, such threshold may be predetermined, or, alternatively or additionally, calculated. For example, such threshold may be calculated based on the average time between sessions 60 of the current multisession 65. For example, such threshold may be calculated as five times the average time between sessions 60 of the current multisession 65. Any similar parameter may be calculated and used by action 94 to determine where to stop the search for more sessions 60 to add to the current multisession 65.

Figure 7:
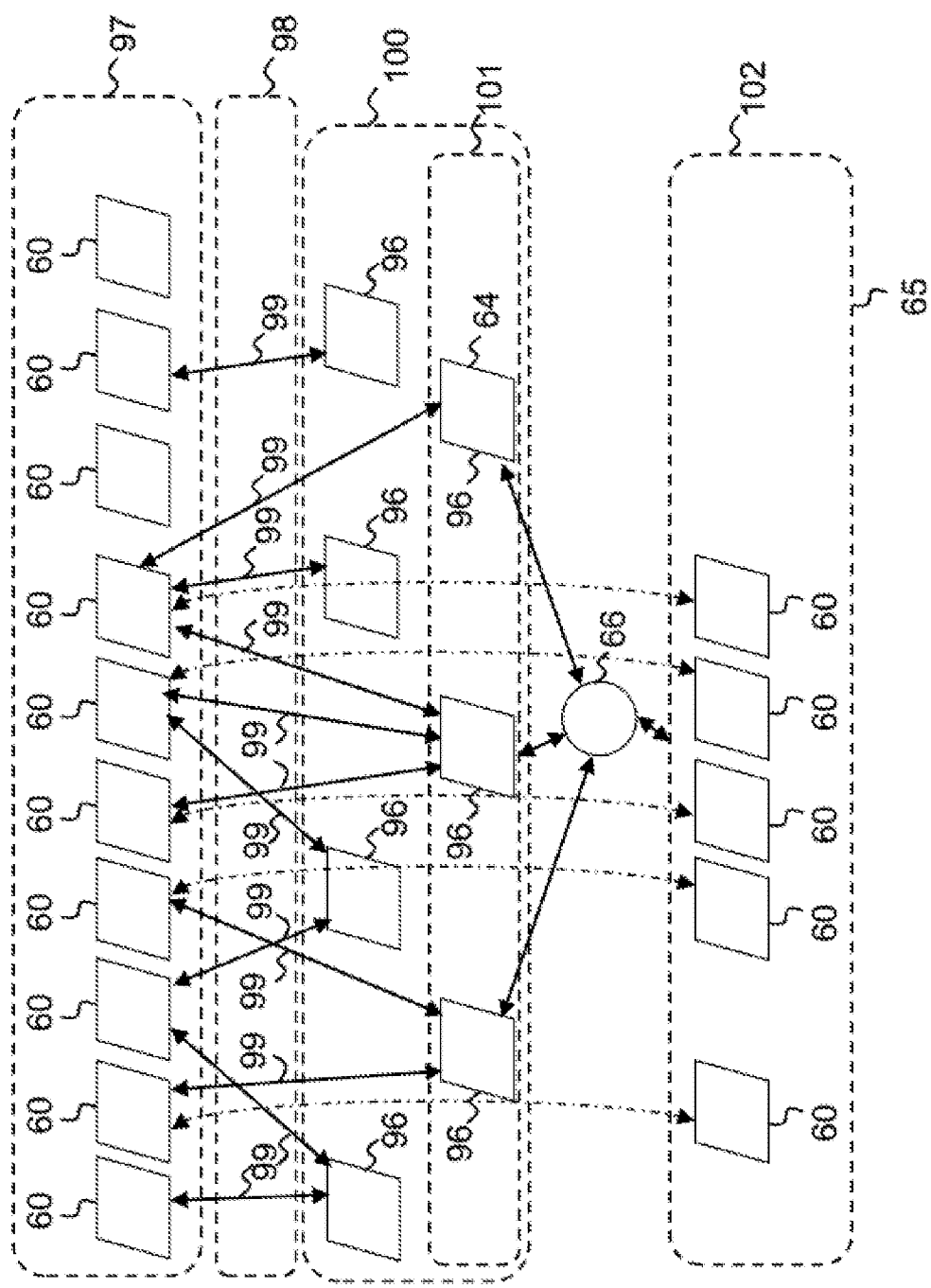
FIG. 7 is a simplified block diagram of the relations between and a collection of sessions, a semantic network of session characteristics, and a multi-session.

Reference is now made to FIG. 7, which is a simplified block diagram of the relations between a multi-session 65, a semantic network 66 of session characteristics 96, and a collection of a plurality of sessions 97, according to one exemplary embodiment.

As an option, the block diagram of FIG. 7 may be viewed in the context of the details of the previous Figures. Of course, however, the block diagram of FIG. 7 may be viewed in the context of any desired environment. Further, the aforementioned definitions may equally apply to the description below.

As shown in FIG. 7, a first plurality of sessions 97 may include any number of sessions 60. All sessions 60 may be associated with the same user 14 (not shown in FIG. 7), typically via client devices 13 (not shown in FIG. 7) associated with the same user 14. Sessions 60 may be derived from clickstream data collected from client devices 13, such as cleaned clickstream data 25 (not shown in FIG. 7).

A first plurality of associations 98 may include associations 99 associating one or more sessions 60 with one or more session characteristics 96 of a first plurality 100 of session characteristics 96. A second plurality 101 of session characteristics 96 may be selected from the first plurality 100 of session characteristics 96. The session characteristics 96 of the second plurality 101 are associated with an anchor subject 64, for example, by forming a semantic network 66.

The session characteristics 96 of the second plurality 101 may determine a second plurality 102 of sessions 60, which are all associated with the anchor subject 64 (e.g., via session characteristics 96 of the second plurality 101, and/or semantic network 66). The second plurality 102 of sessions 60 may form a multi-session 65.

It is appreciated that anchor subject 64 may be selected from the second plurality 101 of session characteristics 96, or alternatively, the session characteristics 96 of the second plurality 101 may be selected according to the anchor subject 64.

It is appreciated that any number of sessions 60 may be associated with an anchor subject 64. It is appreciated that a limit for associating further sessions 60 may be set, for example as a threshold, for example a scoring threshold and/or a time threshold.

A scoring threshold may evaluate the type of characteristics 96, and/or count of associations 99 associating a particular session with the particular anchor subject 64 and/or the particular semantic network 66.

A time threshold may set a limit to the time between a session 60 being candidate for adding to a particular multi-session 65, and any of the sessions 60 that are members of the particular multi-session 65. A time threshold may be calculated as a fixed time value, or a statistical time value such as a multiplication of an average time difference between the sessions the sessions 60 that are members of the particular multi-session 65, or any similar calculation.

It is expected that during the life of this patent many relevant advertisement systems and applications will be developed and the scope of the terms herein, particularly of the terms "client device", "mobile device", "mobile application", "advertisement" or "mobile advertisement", "advertisement bidding", and "bidding agent" or "ad-network", is intended to include all such new technologies a priori.

Additional objects, advantages, and novel features of the embodiments described herein will become apparent to one ordinarily skilled in the art upon examination of the following examples, which are not intended to be limiting. Additionally, each of the various embodiments and aspects of embodiments as delineated hereinabove and as claimed in the claims section below finds experimental support in the following examples.

It is appreciated that certain features of the system and method described herein, which are, for clarity, described in the context of separate embodiments, may also be provided in combination in a single embodiment. Conversely, various features, which are, for brevity, described in the context of a single embodiment, may also be provided separately or in any suitable sub-combination.

Although the system and methods has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A method for tracking a user web journey, the method comprising:
   receiving, by a computerized server, from a plurality of computerized client devices communicatively coupled via a communication network to at least one content server of a plurality of content servers, a first data content comprising a plurality of first data items, wherein at least some of the computerized client devices are operated by a same user, and wherein said first data content comprises clickstream data communicated between any computerized device of said plurality of computerized devices and any content server of said plurality of content servers;
   dividing the first data content into a plurality of sessions, wherein at least two sessions are associated with the same user and derived from clickstream data collected from at least two respective computerized client devices associated with the same user;
   associating the at least two sessions to form a multi-session; and
   with regards to the multi-session, performing at least one of the following actions:
      analyzing the multi-session as a continuous session; and
      analyzing the multi-session to determine a computerized client device of preference for a particular at least one session characteristic of the respective user.

2. The method according to claim 1, further comprising:
   ordering the at least two sessions of the multi-session according to time of at least one time mark associated with the respective session;
   wherein at least one of the first data content and the first data item includes a respective time mark.

3. The method according to claim 1, further comprising performing at least one of the actions of:
   analyzing the sessions to determine a plurality of characteristics of the sessions to form a plurality of session characteristics;
   associating at least two sessions of the plurality of sessions with at least one session characteristic; and
   selecting the at least two sessions of the multi-session according to similarity of the at least one session characteristic of the at least two sessions.

4. A method for tracking a user web journey, the method comprising:
   receiving, by a computerized server, from a plurality of computerized client devices communicatively coupled via a communication network to at least one content server of a plurality of content servers, a first data content comprising a plurality of first data items;
   wherein at least some of the computerized client devices are operated by a same user, and
   wherein said first data content comprises at least part of data communicated between any computerized device of said plurality of computerized devices and any content server of said plurality of content servers;
   dividing the first data content into a first plurality of sessions, wherein at least two sessions are associated with the same user and derived from clickstream data collected from at least two respective computerized client devices associated with the same user;
   collecting, from said first plurality of sessions, a second plurality of sessions associated with the same user to form a session collection;
   analyzing the session collection to determine a second plurality of sessions associated with the same user and with a same set of characteristics, the same set of characteristics comprising at least one session characteristic; and
   arranging the second plurality of sessions into the multi-session.

5. The method according to claim 3, further comprising:
   determining one session characteristic as an anchor session characteristic of the multisession;
   selecting a second plurality of session characteristics according to at least one association between the session characteristics of the second plurality of session characteristics and the anchor session characteristic; and
   arranging the second plurality of sessions into the multi-session according to associations between at least one session characteristics of the second plurality of sessions and the second plurality of session characteristics.

6. The method according to claim 3, further comprising:
   collecting a first plurality of session characteristics;
   determining a first plurality of associations associating between at least some of the session characteristics of the first plurality of session characteristics;
   selecting one session characteristic from the first plurality of associations as an anchor session characteristic of the multi-session;
   selecting a second plurality of session characteristics according to the associations between the session characteristics of the second plurality of session characteristics with the particular anchor session characteristic; and
   arranging the second plurality of sessions into the multi-session according to the second plurality of session characteristics.

7. The method according to claim 6, further comprising at least one of:
   forming the second plurality of session characteristics as a semantic network; and
   arranging the multi-session according to the semantic network.

8. A non-transitory computer readable medium storing computer code executable by a processor to perform a method for associating a device with a user, the method comprising:
receiving, by a computerized server, from a plurality of computerized client devices communicatively coupled via a communication network to at least one content server of a plurality of content servers, wherein at least some of the computerized client devices are operated by a same user, a first data content comprising a plurality of first data items, and
wherein said first data content comprises at least part of data communicated between any computerized device of said plurality of computerized devices and any content server of said plurality of content servers;
dividing the first data content into a plurality of sessions, wherein two or more sessions of the plurality of sessions are associated with the same user;
selecting at least two sessions of the plurality of sessions that are received from at least two respective computerized client devices associated with the same user;
associating the selected at least two sessions to form a multi-session; and
performing at least one of the actions of:
analyzing the multi-session as a continuous session; and
analyzing the multi-session to determine a computerized client device of preference for a particular at least one session characteristic of the respective user.

9. The non-transitory computer readable medium storing computer code executable by a processor according to claim 8, further comprising:
ordering the at least two sessions of the multi-session according to time of at least one time mark associated with the respective session;
wherein at least one of the first data content and the first data items includes a respective time mark.

10. The non-transitory computer readable medium storing computer code executable by a processor according to claim 8, further comprising at least one of the actions of:
analyzing the sessions to determine a plurality of characteristics of the sessions to form a plurality of session characteristics;
associating at least two sessions of the plurality of sessions with at least one session characteristic; and
selecting the at least two sessions of the multi-session according to similarity of the at least one session characteristic of the at least two sessions.

11. A non-transitory computer readable medium storing computer code executable by a processor to perform a method for associating a device with a user, the method comprising:
receiving, by a computerized server, from a plurality of computerized client devices communicatively coupled via a communication network to at least one content server of a plurality of content servers, wherein at least some of the computerized client devices are operated by a same user, a first data content comprising a plurality of first data items, and
wherein said first data content comprises at least part of data communicated between any computerized device of said plurality of computerized devices and any content server of said plurality of content servers;
dividing the first data content into a plurality of sessions, wherein two or more sessions of the plurality of sessions are associated with the same user;
selecting at least two sessions of the plurality of sessions that are received from at least two respective computerized client devices associated with the same user;
associating the selected at least two sessions to form a multi-session;
collecting a first plurality of sessions associated with the same user to form a session collection;
analyzing the session collection to determine a second plurality of sessions associated with the same user and with a same set of characteristics, the same set of characteristics comprising at least one session characteristic; and
arranging the second plurality of sessions into the multi-session.

12. The non-transitory computer readable medium storing computer code executable by a processor according to claim 8, additionally comprising:
determining one session characteristic as an anchor session characteristic of the multi-session;
selecting a second plurality of session characteristics according to at least one association between the session characteristics of the second plurality of session characteristics and the anchor session characteristic; and
arranging the second plurality of sessions into the multi-session according to associations between at least one session characteristics of the second plurality of sessions and the second plurality of session characteristics.

13. The non-transitory computer readable medium storing computer code executable by a processor according to claim 8, further comprising:
collecting a first plurality of session characteristics;
determining a first plurality of associations associating between at least some of the session characteristics of the first plurality of session characteristics;
selecting one session characteristic from the first plurality of associations as an anchor session characteristic of the multi-session;
selecting a second plurality of session characteristics according to the associations between the session characteristics of the second plurality of session characteristics with the particular anchor session characteristic; and
arranging the second plurality of sessions into the multi-session according to the second plurality of session characteristics.

14. The non-transitory computer readable medium storing computer code executable by a processor according to claim 13, further comprising performing at least one of the actions of:
forming the second plurality of session characteristics as a semantic network; and
arranging the multi-session according to the semantic network.

15. A network computer for tracking a user web journey, the network computer comprising non-transitory computer readable medium storing computer code executable by a processor of the computer the computer code comprising:
a module for receiving from a plurality of computerized client devices communicatively coupled via a communication network to at least one content server of a plurality of content servers, a first data content comprising a plurality of first data items,
wherein at least some of the computerized client devices are operated by a same user, and
wherein said first data content comprises clickstream data communicated between any computerized device of said plurality of computerized devices and any content server of said plurality of content servers;

a module for dividing the first data content into a plurality of sessions, wherein two or more sessions of the plurality of sessions are associated with the same user;

a module for selecting at least two sessions of the plurality of sessions that are received from at least two respective computerized client devices associated with the same user;

a module for associating the selected at least two sessions to form a multi-session; and performing at least one of the actions of:
  analyzing the multi-session as a continuous session; and
  analyzing the multi-session to determine a computerized client device of preference for a particular at least one session characteristic of the respective user.

16. A network computer for tracking a user web journey, the network computer comprising non-transitory computer readable medium storing computer code executable by a processor of the computer the computer code comprising:

a module for receiving from a plurality of computerized client devices communicatively coupled via a communication network to at least one content server of a plurality of content servers, a first data content comprising a plurality of first data items wherein at least some of the computerized client devices are operated by a same user, and wherein said first data content comprises at least part of data communicated between any computerized device of said plurality of computerized devices and any content server of said plurality of content servers;

a module for dividing the first data content into a plurality of sessions, wherein at least two sessions are associated with the same user and derived from clickstream data collected from at least two respective computerized client devices associated with the same user;

collecting sessions associated with the same user to form a session collection;

analyzing the session collection to determine a second plurality of sessions associated with the same user and with a same set of characteristics, the same set of characteristics comprising at least one session characteristic; and arranging the second plurality of sessions into the multi-session.

* * * * *